April 20, 1965    H. ZAUSCHER    3,179,940
ANTENNA SYSTEM FOR TWIN-CHANNEL VISUAL DIRECTION FINDER
Filed Oct. 23, 1961    3 Sheets-Sheet 2
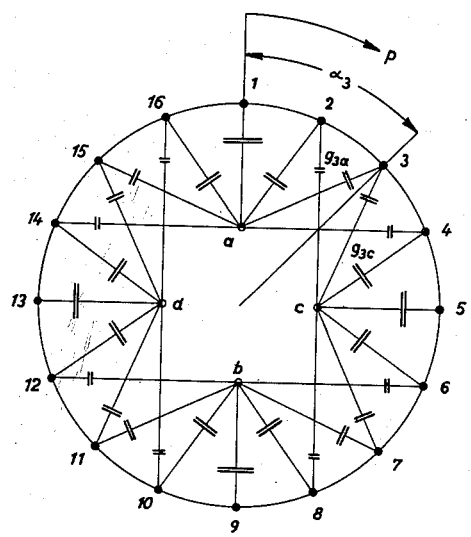
Fig. 3
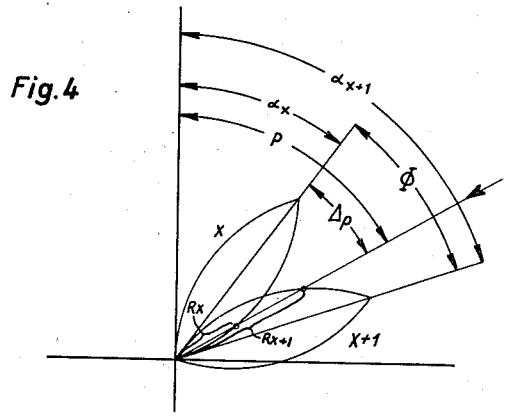
Fig. 4
Fig. 5a
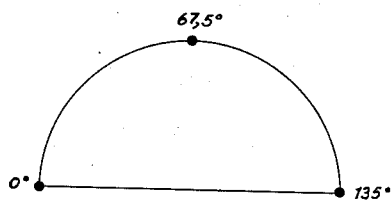
Hermann Zauscher
INVENTOR.
BY Mestern Ross & Mestern April 20, 1965 H. ZAUSCHER 3,179,940
ANTENNA SYSTEM FOR TWIN-CHANNEL VISUAL DIRECTION FINDER
Filed Oct. 23, 1961 3 Sheets-Sheet 3

INVENTOR
HERMANN ZAUSCHER

BY *Mestern, Ross & Mestern*

ATTORNEYS

United States Patent Office 3,179,940
Patented Apr. 20, 1965

3,179,940
ANTENNA SYSTEM FOR TWIN-CHANNEL
VISUAL DIRECTION FINDER
Hermann Zauscher, Steinebach am Worthsee, Germany,
assignor to Maximilian Wachtler, Sierksdorf, Germany
Filed Oct. 23, 1961, Ser. No. 146,757
Claims priority, application Germany, Oct. 24, 1960,
W 28,772
6 Claims. (Cl. 343—119)

This invention relates to a twin-channel visual direction finder with direct indication on the screen of a cathode-ray tube. A feature of the invention is that antennas with unilaterally focuesd directional patterns are arranged on the circumference of a circle in such a way that each directional pattern faces outwardly, with its axis of symmetry directed radially, and that the aperture angle of the main lobe of each directional pattern, which is defined by the two radial tangents to the main lobe, is twice as large as the central angle defined by the angular spacing of the two axes of symmetry of two adjacent directional patterns and that each directional pattern, proceeding from its point of contact with each of the two radial tangents, has a substantially sinusoidal course and that the output terminals of the directive aerials are multiplied to the four input terminals of the visual direction finder, the impedances of the multiplying circuit being so dimensioned that the input power of each directional antenna is distributed to the crossed deflection systems of the cathode-ray tube in the ratio of cos $\alpha$: sin $\alpha$, $\alpha$ being the angle between the axis of symmetry of a directional aerial and the zero direction of the antenna system. In one embodiment of the invention the antenna arrays with unilaterally focused directional patterns are arranged side by side on the circumference of a circle in a single horizontal plane. In another embodiment the antenna arrays are arranged in various horizontal planes on top of each other with mutual separation along a vertical axis.

Within the band of still shorter waves, i.e. particularly in the band of decimeter and centimeter waves, the twin-channel principle cannot be applied to a visual direction finder, since the reception of these waves generally requires receiving devices with a high directional sharpness, as can be obtained by linear arrays.

However, even in the band of meter waves, the applicability of the twin-channel visual direction finder in connection with a multiple-aerial Adcock system is limited to cases in which sufficient field intensities are available. But in cases where a direction finder is needed for air-communication safety or monitoring, cases in which the existing field intensities are so low that for pure reception purposes directional aerials with a high directional sharpness are required, a direction finder with the qualities of the "pointer" of the visual direction finder had up to now been relinquished.

This lack is now removed by the present invention. The essential features of the invention consist in the application of an aerial system the single elements of which are not non-directional radiators (as those of an Adcock) but aerial arrays with a pattern of high directional sharpness as they are used for mere reception purposes particularly in the decimeter and centimeter waveband. For this purpose it is of no importance in which way the directional antenna is arranged. It can, for example, be composed of so-called linear arrays (as they are used for the television receiving aerials) which consist of single dipoles being arranged in a certain distance on a straight line, or it can be composed of horn elements. Furthermore, one can also apply slotted wave guides (as used in radar technique) which consist of a linear wave guide, or directional aerials in combination with parabolic or spherical reflectors.

According to the invention these aerial arrays are combined to a circular array in such a way that the line of symmetry of the directional pattern of each directional aerial runs in a radial direction. For this purpose the single arrays can be mounted on a vertical central axis in such a manner that the maximum of each array is shifted by a certain angle compared with that of the adjacent one and that the aerials are also staggered in height. Such arrangements will be used as direction-finding antenna systems according to the invention, if the system has to be built by directional aerials which existed already for purposes of reception.

It is, of course, also possible to construct the aerial system as a circular array from a great number of aerials in such a way that the single aerials belonging to a directional pattern are not staggered in height, but that all radiators are, for example, arranged as vertical aerials on a horizontal plane. In this case the aerials on the horizontal plane are arranged in such a way that they are located on concentric circles, whereby the aerial spacings on each circle the mutual spacings of the circles and their number can be chosen according to the desired form of the directional pattern. The aerials being arranged in radial directions are combined in individual linear arrays. Such arrays will be projected, if a directional aerial system is developed for a special bearing problem and has not to be built from already existing directional receiving aerial systems.

If according to the furthermore proposed measures of the invention the unidirectionally effective receiving elements of the circlular array are designed in such a way that each pattern—proceeding from its minimum of reception at the beginning of the adjacent pattern—can be approximated by a sinusoid, all directive aerial elements can be connected in such a way that two voltages are obtained the amplitudes of which follow a sine-law of the angle of azimuth and a cosine law respectively, so that the voltages can be fed to the inputs of the twinchannel visual direction finder. Thus an arrangement has been produced which allows to apply the twinchannel principle even to direction finding of waves being so short that they can only be received by means of antenna systems with high directional sharpness.

The aforedescribed features of the invention will be discussed in detail with reference to the accompanying drawing in which:

FIG. 3 shows a reduction arrangement for 16 directional characteristics.

FIG. 4 shows the arrangement of two adjacent directional characteristics according to the invention.

FIG. 5a shows the corresponding azimuthal positions.

The directional aerials employed in the system possess a directional pattern in the form of a unidirectional beam. All patterns are identical and directed radially outwardly from a common center with equal angular spacing, either over the full azimuthal range from 0 to 360° or only within a certain sector of a horizontal plane. There is a simple relation between the number $n$ of the directive patterns and the angular aperture $2\Phi$ of the main beam of each individual pattern. In the case where $$2\Phi < \frac{360}{n}$$

there remain silent zones between the different beams where reception or direction finding is not at all possible. In the case of $$2\Phi = \frac{360}{n}$$

it is possible to take bearings at all points, but with varying sensitivity. However, the maximum error arising is $\pm\Phi$, because it cannot be determined from which region of the beam lobe the radiation comes in. This is without importance only if the resulting bearing error is smaller than the error caused by other reasons, for example the instrumental error. It would thus be possible, if one admits the usually allowed bearing error of 1°, to work with an aperture of $2\Phi=2°$ in the characteristic of each individual pattern, with a total of 180 uniformly distributed directional aerials.

However, in cases where such a high directional sharpness is not necessary because of a sufficient field intensity, it is useful to work with overlapping unidirectional characteristics. In this case one not only obtains a nearly uniform sensitivity but can also receive and take bearings with very little errors if the characteristics are given a special shape.

It is sufficient that always two succeeding characteristics overlap. This arrangement of the invention can be described by the equation $$\Phi = \frac{360}{n} \quad (1)$$

It is thus required that always two directional aerials are excited by the incoming electromagnetic radiation.

Figure 1:
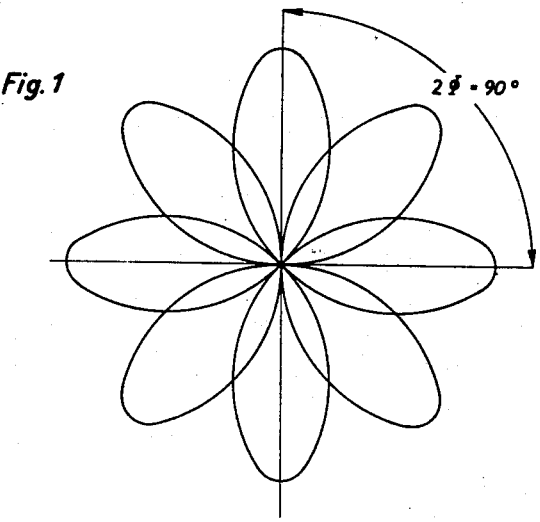
FIG. 1 shows a symmetrical arrangement of 8 directional characteristics with high directional sharpness.

FIG. 1 shows such an array of eight uniformly distributed patterns each with an aperture of 90° (defined as the angle between the two radial tangents) of the main receiving beam. It is, of course, also possible to use other arrangements, for example with 16 directional patterns and an aperture of 45° each.

Figure 2:
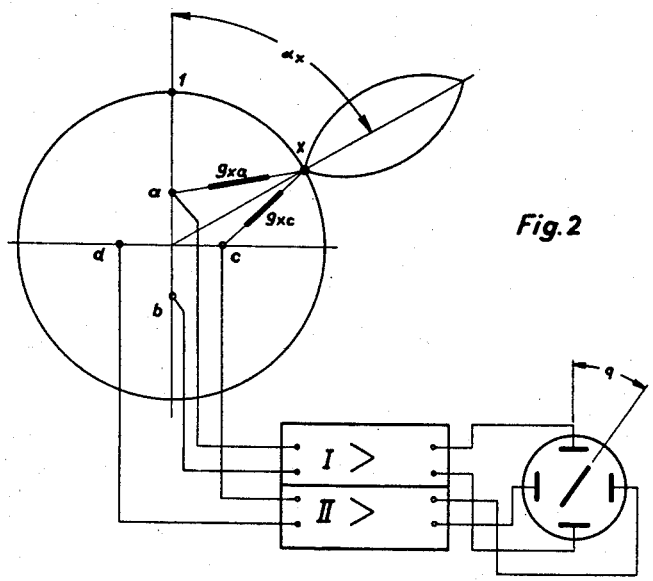
FIG. 2 shows the principle of the reduction arrangement for the connection of the aerials to the twinchannel visual direction finder.

In order to obtain an indication on the screen of the cathode ray tube, it is necessary that the energy picked up by any given directional aerial of the circular array is distributed to the two amplifying channels of the receiver according to the sine and cosine respectively of its position angle $\alpha$ (i.e. the angle between the line of symmetry of the aerial and the zero direction of the whole array). In FIG. 2 the amplifier I with the input terminals $a$ and $b$ has its output connected across the vertical pair of deflecting plates of the cathode-ray tube CR and, in the same way, the amplifier II with the input terminals $c$ and $d$ energizes the horizontal pair of deflecting plates. In this case the directional aerial (arbitrarily chosen) with the position angle $\alpha_x$ has to be connected with the terminal $a$ via a conductance $g_{xa}=k \cos \alpha_x$ and with the terminal $c$ via a conductance $g_{xc}=k \sin \alpha_x$, ($k$ being a constant) in order to obtain the required distribution of energy and the correspondance between the indicated angle $q$ and the angle $\alpha_x$ (FIG. 2).

If one uses 16 directional aerials and utilizes the aforestated distribution of energy, one obtains the arrangements shown in FIG. 3. The required individual conductances can be obtained by wave guides or capacitances or by means of a capacitive goniometer with two crossed pairs of search plates. One pair of plates is tied to the terminals $a$ and $b$ and the other to the terminals $c$ and $d$.

Figure 3A:
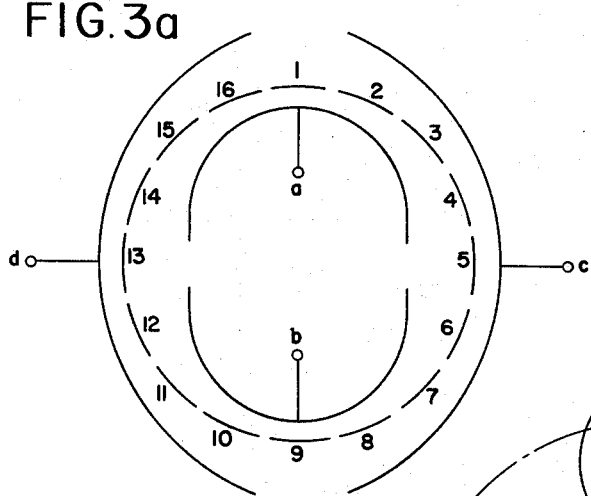
FIG. 3a is a diagram of a capacitive goniometer used in system of the present invention.
Figure 3B:
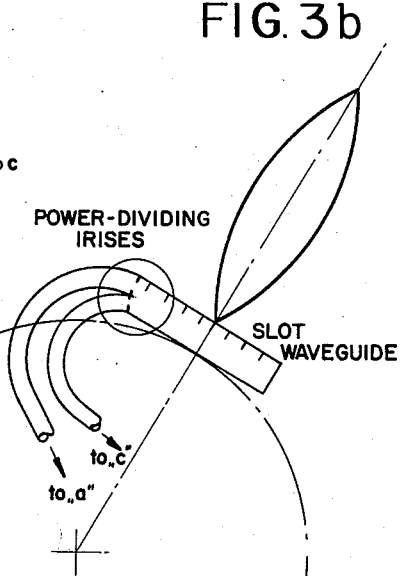
FIGS. 3b and 3c are diagrams of a conventional slotted wave guide for use with the invention.
Figure 3C:
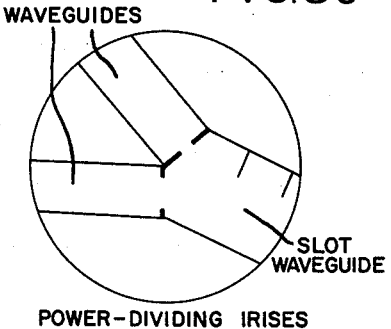

Thus FIG. 3 illustrates, in the form of capacitances of different lengths, the various conductances (such as those referred to as $g_{xa}$ and $g_{xc}$) whose magnitudes follow the laws stated above and below. It will be noted that the aerials 1, 5, 9 and 13 are each connected to but one input terminal, e.g. terminal $a$ in the case of aerial 1; these aerials may, however, also be considered as connected to one of the other pair of terminals (e.g. $c$) via a impedance of infinite magnitude which is represented by the absence of a physical connection. In the capacitive goniometer of FIG. 3a, the two pairs of search plates are stationary and are of such shape (exaggerated in FIG. 3a) as to provide the desired variations in capacitive coupling. FIG. 3b shows a conventional slotted wave guide suitable for use with this system, the wave guide (FIG. 3c) having two outlets for delivering energy in a predetermined ratio to, for example, the terminals $a$ and $c$. This ratio may be established by suitably proportioned power-dividing irises.

On account of the overlap of the characteristics of succeeding aerials, the energy from two adjacent antennas is generally fed to the receiver. In order to obtain correct bearings in cases where the azimuth angle $p$ of the incoming wave does not correspond to one of the position angles $\alpha_x$, it is important to know the exact course of the receiving characteristic. According to the invention this course has to be such that it can be approximated by a sinusoid. With the notation used in FIG. 4, the course of the characteristic of the aerial $x$ is defined by the length of its radius vector $R_x$ being proportional to the expression $\sin (\Phi-\Delta p) = \sin (\Phi+\alpha_x-p)$, the radius vector $R_x+1$ of the aerial $_x$ being proportional to $$\sin \Delta p = \sin (p-\alpha_x)$$

Under the above conditions the characteristics terminate in a point in the main direction of reception. Beams with such characteristics are already known as pencil beams.

Upon the use of such characteristics and with consideration of the conductances of the multiplying circuit, the voltage at the terminals $a$, $b$ is given by the expression $$U_a \approx \cos \alpha_x \sin (\Phi+\alpha_x-p) + \cos (\alpha_x+\Phi) \sin (p-\alpha_x) = \cos p \sin \Phi \quad (2)$$

The voltage at the terminals $c$, $d$ then is $$U_c \approx \sin \alpha_x \sin (\Phi+\alpha_x-p) + \sin (\alpha_x+\Phi) \sin (p-\alpha_x) = \sin p \sin \Phi \quad (3)$$

The angle $q$ indicated on the screen is equal to the angle of azimuth $p$ and thus delivers a correct bearing, because $$\tan q = \frac{U_c}{U_a} = \frac{\sin p \sin \Phi}{\cos p \sin \Phi} = \tan q \quad (4)$$

or $q=p$.

Even if the characteristics do not have a sinusoidal course, the proposed combination of the directional characteristics can be used for taking bearings by means of the present visual direction finder. However, in this case the bearings are not free from errors, according to the expression $q=p$, but produce an error curve whose course depends on the form of the combined directional characteristics. The bearings are free from errors in the directions of the lines of symmetry of the characteristics and in the directions lying midway between two lines of symmetry, i.e. at the location where two adjacent characteristics are intersecting. If 16 directional characteristics are used, one obtains an error curve with 32 half periods.

The bearing indications obtainable by the described means are, of course, still ambiguous in the same way as the usual indications obtained upon application of crossed loops and a visual direction finder. The invention furthermore provides two ways for sense determination.

The first way consists in providing means for selectively grounding the four terminals $a$, $b$, $c$, $d$. If, for example, terminal $a$ is grounded and the luminous trace of tube CR remains unchanged, one knows that the transmitter is located within an azimuthal range of 90 to 270°. If terminal $c$ is grounded and the luminous trace does not change, the transmitter is located within a range of 180 to 360°. According to the invention, always two adjacent terminals are grounded. Thus one knows immediately from which quadrant the transmission comes in, if one defines as criterion for the correct grounding knob that during its operation the luminous trace on the screen of the cathode ray tube may neither shift nor disappear. The following diagram indicates the coordination between the function and the inscription of the four grounding knobs:

| Function (grounding of) | a, c | c, b | b, d | d, a |
|---|---|---|---|---|
| Quadrant | III | IV | I | II |

(The quadrants are numbered in the usual clockwise direction beginning at the zero direction of the areial system.)

The second mode of sense determination produces an automatically correct sense indication. For this purpose one applies the conventional semicircular 360° scale in such a way that by means of a special multiplying network the modified expression $q=p/2$ becomes valid for the angle of bearing. Since, always $$\tan q = \frac{g_{xo}}{g_{xa}}$$

and since it is now desired to obtain the relationship $\tan q = \tan p/2$, the conductances of the multiplying circuit have to be made proportional to the cosine and the sine, respectively, of half of the position angle $\alpha_x$ of the aerial $x$.

It is thus necessary to choose $$g_{xo} \sim \sin \frac{\alpha x}{2} \text{ and } g_{xa} \sim \cos \frac{\alpha x}{2} \qquad (5)$$

This modified law for obtaining an automatically correct sense indication can also be used with great advantage for direction finders which only take bearings within a certain sector $\beta$ and not within the whole azimuthal range from 0 to 360°. If, for example, the sector of interest extends over an arc $\beta=200°$, it is not useful to apply the same conductances for the distribution of energy of the individual aerials as would correspond to the law $q=p/2$.

If, with a sector of interest encompassing only 200° of the usual 360° scale the usual law $q=p/2$ were applied, one could utilize only 100° of the scale, although an arc of 180° is available. The measure according to the invention for the determination of the conductances then consists in the application of the law $$q = \frac{180p}{\beta}$$

q being again the angle of bearing indicated on the cathode-ray tube, p being the azimuth angle, $\alpha_x$ being the position angle of the aerial $x$ and $\beta$ being the angular extent of the sector in which the bearings are taken. The conductances of the multiplying circuit thus are the following:

$$g_{xo} \sim \sin\left(\frac{180\alpha_x}{\beta}\right) \text{ and } g_{xa} \sim \cos\left(\frac{180\alpha_x}{\beta}\right) \qquad (6)$$

Figure 5:
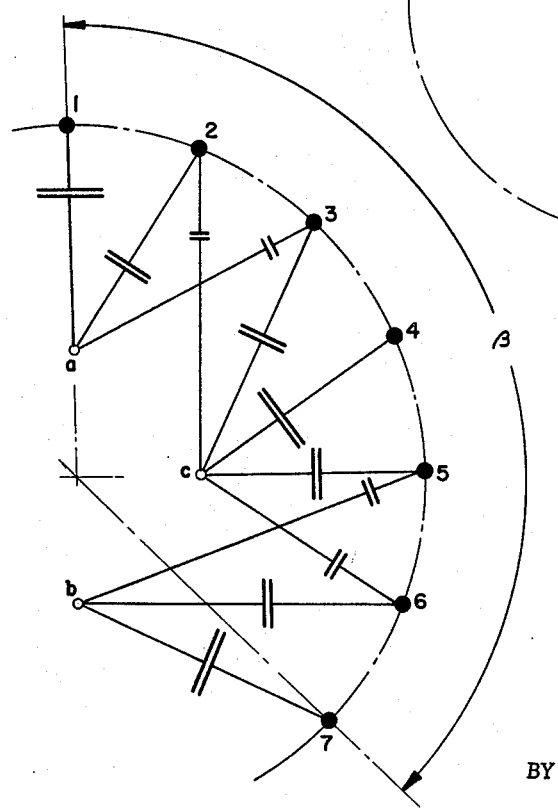
FIG. 5 illustrates an array similar to that of FIG. 3.

For each sector of arc $\beta$ it is thus possible to make full use of the whole semicircular scale required for sense determination. The spacings on the scale are a maximum and thus one obtains the highest accuracy possible. In the extreme case where $\beta=360°$, this formula reduces to the form of Equation 5. Thus FIG. 5 shows an array similar to that of FIG. 3 but limited to a sector of arc $\beta$ (here 135°) as described above. FIG. 5a shows the corresponding azimuthal positions as read on a semicircular scale.

I claim:

1. An antenna system for a direction finder provided with a visual indicator having marker means adapted to be deflected in two orthogonally related directions by application of a control voltage across a first and a second pair of input terminals, respectively, the extent and sense of displacement of said marker means in either of said directions depending upon the magnitude and sign of the voltage applied to the respective terminals, comprising:

an array of $n$ directive antenna means angularly equispaced about a vertical axis, $n$ being an integer greater than four, each of said antenna means having a directive receiving pattern with a horizontal main lobe trained radially outwardly from said axis, said lobe having a substantially sinusoidal characteristic in polar co-ordinates centered on said axis, said lobe further having an aperture angle included between its two radial tangents which is substantially twice the angular distance $$\frac{2\pi}{n}$$

between the center lines of the main lobes of adjacent patterns whereby said lobes overlap; and circuit means connecting different groups of said antenna means in multiple to respective input terminals of said indicator, said circuit means having impedances of such magnitude that each antenna means is connected to one of said first pair of input terminals via a conductance substantially proportional to the sine and to one of said second pair of input terminals via a conductance substantially proportional to the cosine of an angle related by a predetermined proportionality factor to the azimuth angle included between the center line of its main lobe and a reference direction of the array, in such sequence that the angular deflection of said marker means from a zero position is substantially proportional to said azimuth angle.

2. A system as defined in claim 1 wherein said antenna means are all disposed in a common horizontal plane.

3. A system as defined in claim 1 wherein said antenna means are relatively staggered in vertical direction.

4. A system as defined in claim 1, further comprising means for selectively grounding said input terminals whereby the sense of incidence of received wave energy can be ascertained.

5. A system as defined in claim 1 wherein said indicator is provided with a semicircular scale bearing designations of a 360° azimuthal range, said conductances being substantially proportional to $$\sin \frac{\alpha}{2} \text{ and } \cos \frac{\alpha}{2}$$

$\alpha$ being said azimuth angle.

6. A system as defined in claim 1 wherein said indicator is provided with a semicircular scale bearing designations of an azimuthal range of angular extent $\beta$, said array extending over an arc substantially equal to $\beta$, said conductances being substantially proportional to $$\sin \frac{\pi\alpha}{\beta} \text{ and } \cos \frac{\pi\alpha}{\beta}$$

$\alpha$ being said azimuth angle.

References Cited in the file of this patent
UNITED STATES PATENTS
2,547,622 4/51 Cleaver _____ 343—113
3,005,198 10/61 O'Meara _____ 343—123 X CHESTER L. JUSTUS, *Primary Examiner.*